United States Patent
Agarwal et al.

(10) Patent No.: US 11,816,052 B2
(45) Date of Patent: Nov. 14, 2023

(54) SYSTEM, APPARATUS AND METHOD FOR COMMUNICATING TELEMETRY INFORMATION VIA VIRTUAL BUS ENCODINGS

(71) Applicant: Intel Corporation, Santa Clara, CA (US)

(72) Inventors: Ishwar Agarwal, Portland, OR (US); Nitish Paliwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 16/659,660

(22) Filed: Oct. 22, 2019

(65) Prior Publication Data

US 2020/0050570 A1    Feb. 13, 2020

(51) Int. Cl.
*G06F 13/40*    (2006.01)
*G06F 13/20*    (2006.01)

(52) U.S. Cl.
CPC .......... *G06F 13/4022* (2013.01); *G06F 13/20* (2013.01)

(58) Field of Classification Search
CPC .............................. G06F 13/20; G06F 13/4022
See application file for complete search history.

(56) References Cited

U.S. PATENT DOCUMENTS

| | | | |
|---|---|---|---|
| 2001/0001616 A1* | 5/2001 | Rakib | H04L 1/006 375/259 |
| 2006/0242352 A1 | 10/2006 | Torudbakken et al. | |
| 2007/0147426 A1 | 6/2007 | Sharma et al. | |
| 2008/0082703 A1 | 4/2008 | Jeno | |
| 2014/0258572 A1 | 9/2014 | More et al. | |
| 2015/0146615 A1* | 5/2015 | Yu | H04W 72/0446 370/328 |
| 2015/0222533 A1* | 8/2015 | Birrittella | H04L 45/66 370/392 |
| 2016/0085619 A1* | 3/2016 | Iyer | H04L 1/0045 714/807 |
| 2018/0253398 A1* | 9/2018 | Wu | G06F 9/28 |
| 2019/0004990 A1 | 1/2019 | Van Doren et al. | |

FOREIGN PATENT DOCUMENTS

WO    WO2016105853    6/2016

OTHER PUBLICATIONS

Denis Foley, et al., "Ultra-Performance Pascal GPU and Nvlink Interconnect," 2017, 11 pages.
Intel Corporation, "Compute Express Link, Specification, Mar. 2019, Revision: 1.0," Mar. 2019, 206 pages.
(Continued)

*Primary Examiner* — Eric T Oberly
(74) *Attorney, Agent, or Firm* — Trop, Pruner & Hu, P.C.

(57) ABSTRACT

In one embodiment, an apparatus comprises: an endpoint circuit to perform an endpoint operation on behalf of a host processor; and an input/output circuit coupled to the endpoint circuit to receive telemetry information from the endpoint circuit, encode the telemetry information into a virtual bus encoding, place the virtual bus encoding into a payload field of a control message, and communicate the control message having the payload field including the virtual bus encoding to an upstream device. Other embodiments are described and claimed.

19 Claims, 11 Drawing Sheets

(56) References Cited

OTHER PUBLICATIONS

U.S. Appl. No. 16/554,974, filed Aug. 29, 2019, entitled, "Enabling Sync Header Suppression Latency Optimization in the Presence of Retimers for Serial Interconnect," by Debendra Das Sharma, et al.
Intel Corporation, "Intel® Optane™ DC Persistent Memory Product Brief," Oct. 1, 2019, 13 pages, https://www.intel.com/content/www/us/en/products/docs/memory-storage/optane-persistent-memory/optane-dc-persistent-memory-brief.html.
European Patent Office, Partial European Search Report dated Jan. 25, 2021 in European patent application No. 20178407.1, 18 pages total.
European Patent Office, Communication Pursuant to Article 94(3) dated Nov. 18, 2022 in European Patent Application No. 20178407.1 (9 pages).

\* cited by examiner

SYSTEM, APPARATUS AND METHOD FOR COMMUNICATING TELEMETRY INFORMATION VIA VIRTUAL BUS ENCODINGS

BACKGROUND

Many computer systems have a collection of devices that couple together via different interconnects. In some cases devices may couple in a hierarchical arrangement. In such systems, it is often complex and difficult to route information efficiently in upstream and downstream directions. Sometimes a Peripheral Component Interconnect Express (PCIe) link is used to couple devices. To provide certain sideband information in these systems, a vendor-defined message of a PCIe communication protocol can be used. However, these messages suffer from long latencies, making their use ineffective for applications requiring real-time signaling and responses.

DETAILED DESCRIPTION

In various embodiments, devices may communicate sideband information such as telemetry information using virtual bus encodings. This encoded information may be communicated over one or more links of a given communication protocol. While implementations herein are described in the context of a Compute Express Link (CXL)-based communication protocol, embodiments are not limited in this regard and may be applicable to many other communication protocols.

In different embodiments, various sideband information can be communicated using virtual bus encodings as described herein. One particular use case is to communicate memory bandwidth utilization levels from memory devices to a host processor of a computing system. The host processor may then use such information to perform rate limiting to maintain quality of service levels for differentiated services. Such rate limiting may be performed, in an embodiment, by throttling one or more sources of memory traffic. Note that virtual bus encodings can be defined generically so that they can be transmitted and interpreted in an implementation-specific manner.

Embodiments may be used in connection with communication of various sideband information. Particular embodiments may be used for clustered accelerators and/or memory expanders. An example embodiment described herein is in connection with a Compute Express Link (CXL) specification-based link such as in accordance with the CXL Specification version 1.1. In yet other embodiments, communication may be accordance with other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

Figure 1:
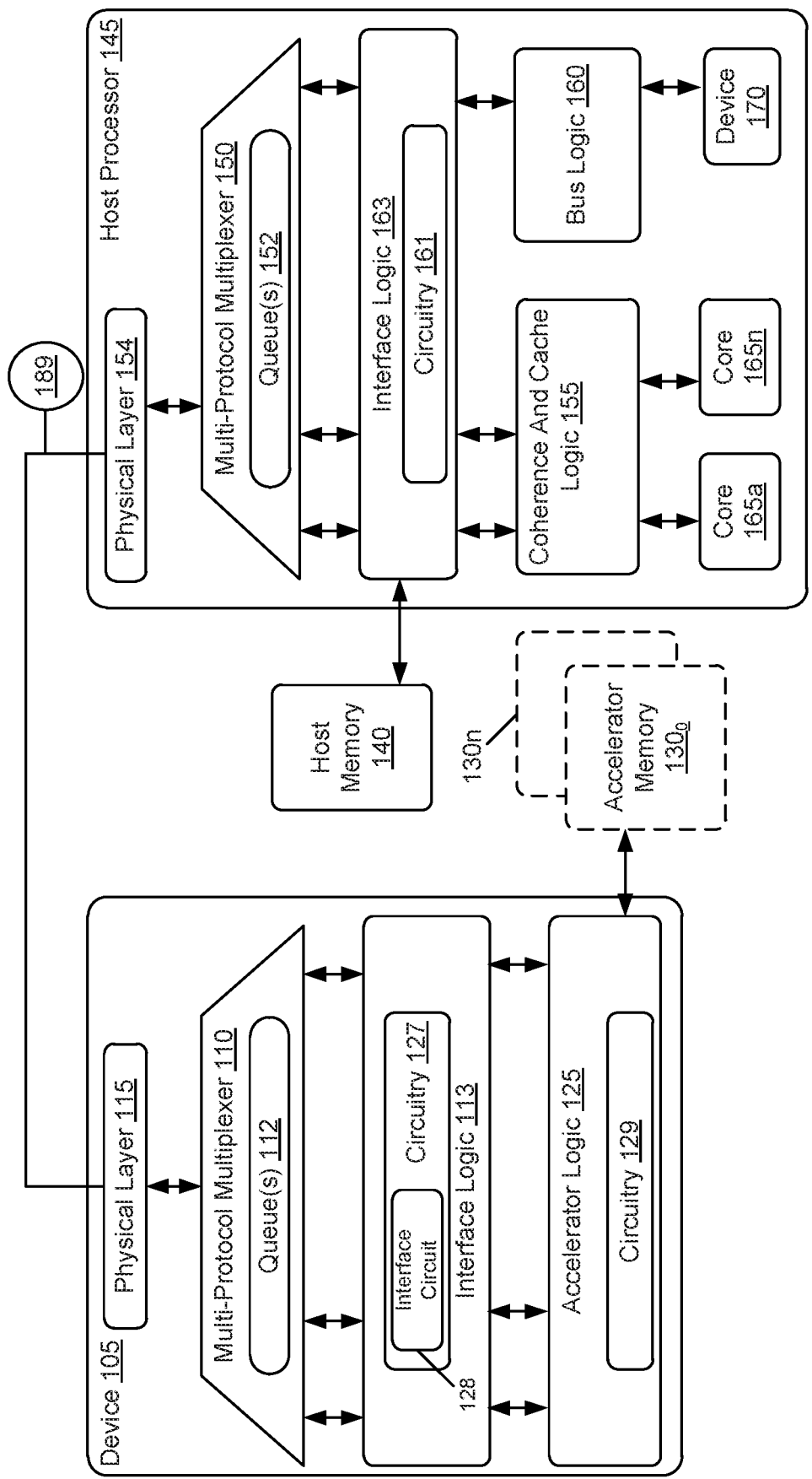
FIG. 1 is a block diagram of a system in accordance with an embodiment.

FIG. 1 is a block diagram of a system in accordance with an embodiment. In FIG. 1, a system 100 may be any type of computing device; however for purposes of illustration assume that system 100 is a server system (or portion thereof) in which various devices may be coupled in a networked arrangement.

As shown in FIG. 1 a device 105 may be an accelerator, processor or memory device coupled to a host processor 145 via an interconnect 189, which may be single interconnect, bus, trace, and so forth. Device 105 and host processor 145 may communicate over link 189 to enable data and messages to pass therebetween. In some embodiments, link 189 may be operable to support multiple protocols and communication of data and messages via the multiple interconnect protocols, including a CXL protocol as described herein. For example, link 189 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 105 may include accelerator logic 125 including circuitry 129. In some instances, accelerator logic 125 and circuitry 129 may provide processing and memory capabilities. Examples of device 105 may include producer-consumer devices such as a graphics or other specialized accelerator, producer-consumer plus devices, software-assisted device memory devices, autonomous device memory devices, and giant cache devices. In some cases, accelerator logic 125 may couple to an optional accelerator memory 130, which optionally may be implemented as multiple memory devices 130₀-130ₙ. Accelerator logic 125 and circuitry 129 may provide the processing and memory capabilities based on the device such as graphics functionality. For example, accelerator logic 125 and circuitry 129 may communicate using, for example, a coherent interconnect protocol for various functions, such as coherent requests and memory flows with host processor 145 via interface logic 113 and circuitry 127. Interface logic 113 and circuitry 127 may determine an interconnect protocol based on the messages and data for communication.

In addition, circuitry 127 may be configured to handle sideband communication in an optimized manner. For example, when there are multiple accelerator devices or memories coupled below device 105, circuitry 127 including an internal interface circuit 128 may be configured to receive incoming messages from these devices where sideband information such as telemetry information may be communicated by way of virtual bus encodings as described herein. In turn, interface circuit 128 may be configured to identify an encoding representing a highest value of the sideband information and, upon a change to this highest value, communicate that value upstream to host processor 145.

In some embodiments, interface logic 113 may be coupled to a multi-protocol multiplexer 110 having one or more protocol queues 112 to send and receive messages and data with host processor 145. Protocol queue 112 may be protocol specific such that each interconnect protocol may be associated with a particular protocol queue. Multiplexer 110 may also implement arbitration circuitry to arbitrate between communications of different protocols and provide selected communications to a physical layer 115.

In various embodiments, host processor 145 may be a main processor such as a CPU. Host processor 145 may be coupled to a host memory 140 and may include coherence logic (or coherence and cache logic) 155, which may include a cache hierarchy. Coherence logic 155 may communicate using various interconnects with interface logic 163 including circuitry 161 and one or more cores 165$a$-$n$. Circuitry 161 may be configured to receive messages having virtual bus encoding information and decode it, e.g., to provide corresponding sideband information to one or more of cores 165, which may take appropriate action, such as performing rate limiting as described herein. Still further, circuitry 161 may be configured to receive messages from cores 165 having virtual bus encodings and communicate downstream such information for use by device 105 or one or more downstream devices. In some embodiments, coherence logic 155 may enable communication via one or more of a coherent interconnect protocol and a memory interconnect protocol.

In various embodiments, host processor 140 may include a device 170 to communicate with a bus logic 160 over an interconnect. In some embodiments, device 170 may be an I/O device, such as a PCIe I/O device. In other cases, one or more external devices such as PCIe devices (which may be one or more of I/O devices 190) may couple to bus logic 170.

In embodiments, host processor 145 may include interface logic 163 and circuitry 161 to enable multi-protocol communication between the components of host processor 145 and device 105. Interface logic 163 and circuitry 161 may process and enable communication of messages and data between host processor 145 and device 105 in accordance with one or more interconnect protocols, e.g., a non-coherent interconnect protocol, a coherent interconnect, protocol, and a memory interconnect protocol, dynamically. For example, interface logic 163 and circuitry 161 may determine a message type for each message and determine which interconnect protocol of a plurality of interconnect protocols to process each of the messages. Different interconnect protocols may be utilized to process the messages.

In some embodiments, interface logic 163 may be coupled to a multi-protocol multiplexer 150 having one or more protocol queues 152 to send and receive messages and data with device 105. Protocol queue 152 may be protocol specific such that each interconnect protocol may be associated with a particular protocol queue. Multiplexer 150 may also implement arbitration circuitry to arbitrate between communications of different protocols and provide selected communications to a physical layer 154.

In other cases, a CXL bus may be used for coupling device types other than accelerators to a host processor. For example, in some cases a memory expander for a host processor may be coupled via a CXL bus.

Figure 2:
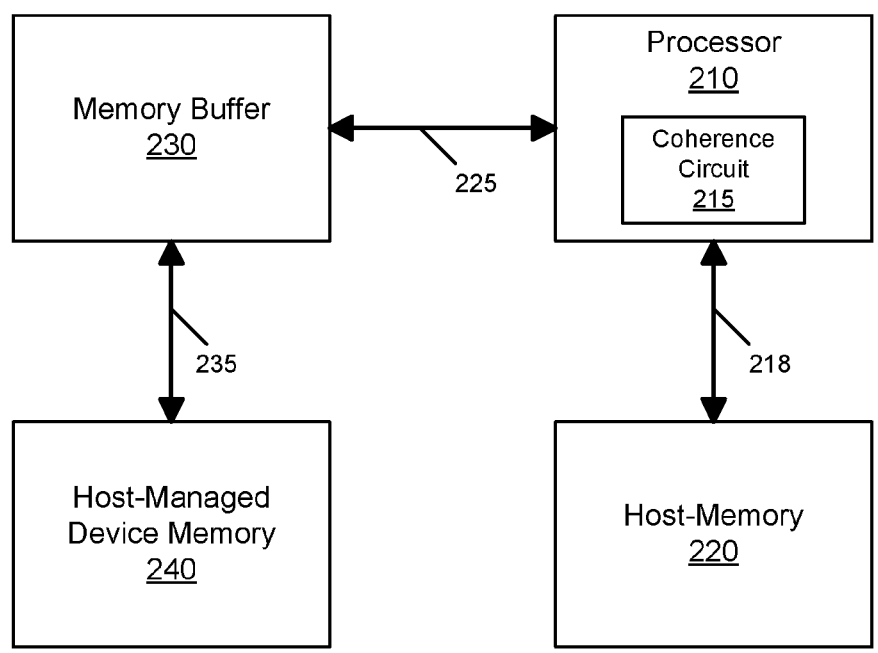
FIG. 2 is a block diagram of a system in accordance with an embodiment of the present invention.

Referring now to FIG. 2, shown is a block diagram of a system in accordance with an embodiment of the present invention. In the embodiment of FIG. 2, system 200 may be a server system having a multicore processor 210 coupled to a memory buffer 230 via a link 225, which in an embodiment may be a CXL bus. In turn, memory buffer 230 couples to a host-managed device memory 240 via another link 235, which also may be a CXL link.

As illustrated, processor 210 includes a coherence circuit 215 configured to maintain coherency between information stored in a host memory 220 (coupled to host processor 210 via a link 218) and information stored in host-managed device memory 240. Understand while shown at this high level in the embodiment of FIG. 2, many variations and alternatives are possible. For example a hierarchical arrangement of memory or other devices may couple below memory buffer 230 for purposes of memory expansion or other uses.

Figure 3:
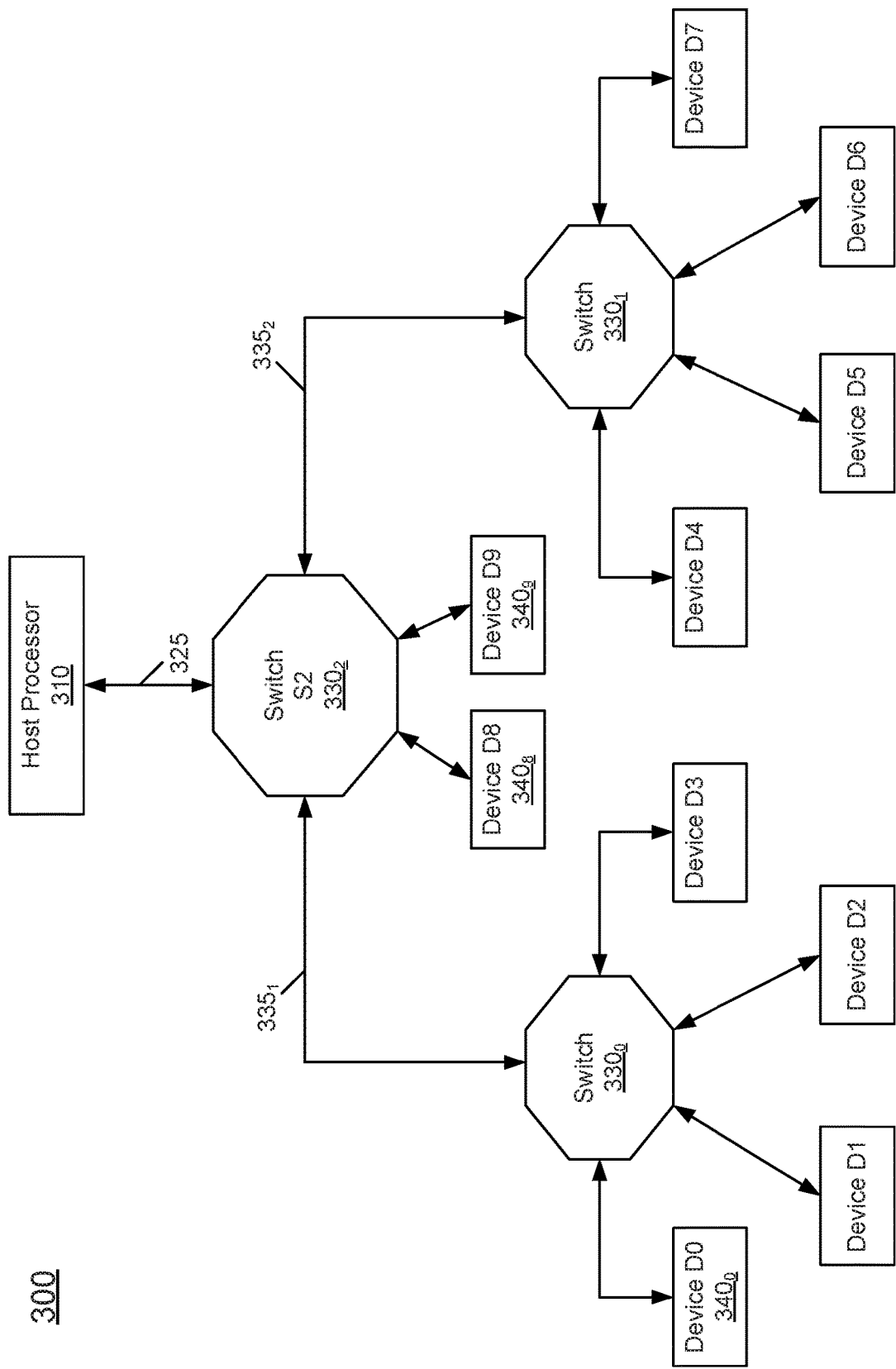
FIG. 3 is a block diagram of a system in accordance with another embodiment of the present invention.

Referring now to FIG. 3, shown is a block diagram of a system in accordance with another embodiment of the present invention. As shown in FIG. 3, a system 300 is another server system having a hierarchical arrangement of memory devices coupled to a host processor 310 via a CXL bus 325. More specifically, system 300 enables port expansion by providing a plurality of fabric switches $330_{0-2}$ to which multiple devices couple. Specifically shown in FIG. 3, in a first hierarchical level, fabric switches $330_{0-1}$ each may have a plurality of endpoint devices $340_0$-$340_7$ coupled thereto. In a particular embodiment, each endpoint device 340 may be a memory device to provide memory expansion capabilities to system 300. In some cases, these memory devices may be of different media types. For example, some of the devices may be a given volatile memory type and others of the devices may be a given non-volatile memory type. Using different virtual bus identifiers for the different memory types enables upstream routing of telemetry information of the different memory types in a single message.

In turn, fabric switches $330_{0,1}$ of this first hierarchical level couple to another fabric switch $330_2$ of a second hierarchical level. As further illustrated, endpoint devices 348, 349 may directly couple to fabric switch $330_2$. In turn, fabric switch $330_2$ couples via an upstream port to a downstream port of host processor 310.

With embodiments, multiple endpoint devices may efficiently communicate upstream sideband information such as telemetry information. Fabric switches 330 may support aggregation of virtual bus encodings from endpoint devices 340 hierarchically at each level. In a particular embodiment, a single highest encoding of multiple encodings provided by individual endpoint devices may be communicated from an upstream port of fabric switch $330_2$ to a downstream port of host processor 310. In turn, information sourced from host processor 310 and received in the upstream port of fabric switch $330_2$ is disseminated and propagated to endpoint devices 340. While shown at this high level in the embodiment of FIG. 3, many variations and alternatives are possible.

Figure 4:
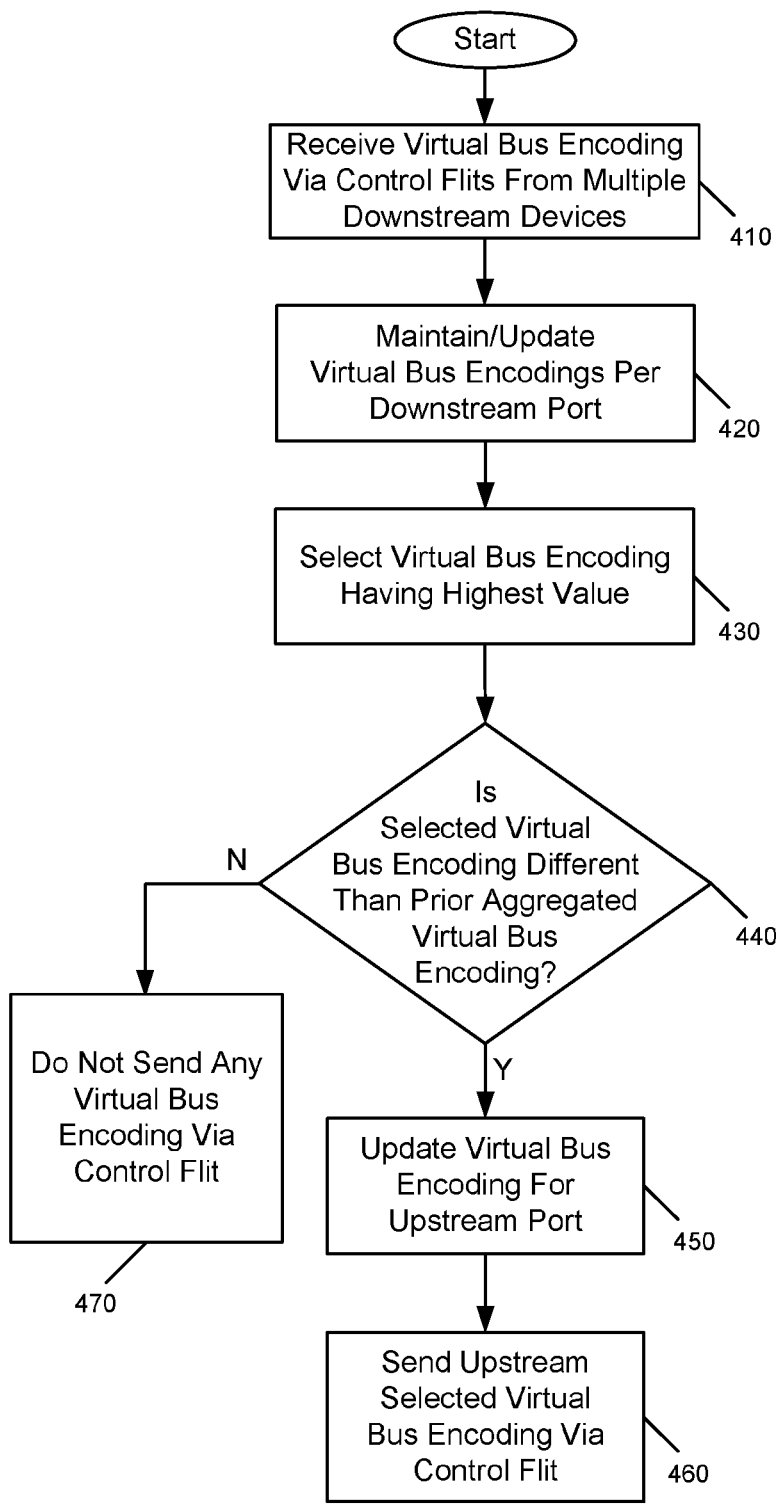
FIG. 4 is a flow diagram of a method in accordance with an embodiment of the present invention.

Referring now to FIG. 4, shown is a flow diagram of a method in accordance with an embodiment of the present invention. As shown in FIG. 4, method 400 is a method for aggregating virtual bus encodings received from multiple endpoint devices. As such, method 400 may be performed by an aggregation circuit, which in an embodiment may be implemented within interface circuitry, e.g., present in a fabric switch or other device. Accordingly, method 400 may be performed by hardware circuitry, firmware, software and/or combinations thereof.

As illustrated, method 400 begins by receiving virtual bus encodings from multiple endpoint devices (block 410). More specifically in an embodiment, a fabric switch may receive multiple virtual bus encodings within control flits or other control messages received from endpoint devices. Note that these incoming control messages may be received asynchronously from the devices. Control next passes to block 420 where stored virtual bus encodings may be maintained and/or updated. More specifically, the fabric switch may provide an associated storage such as a register or field within a vector register or so forth for each downstream device. Thus at block 420 in response to a received virtual bus encoding from a given downstream device, the fabric switch may maintain a current value of the virtual bus encoding stored in association with this downstream port, if the value has not changed. Instead if the value has changed, the fabric switch may update the stored virtual bus encoding to the received value.

Still with reference to FIG. 4, next a virtual bus encoding having a highest value amongst the receiving virtual bus encodings may be selected (block 430). Control passes to diamond 440 where it is determined whether this selected virtual bus encoding is different than a prior aggregated virtual bus encoding. In an embodiment, this prior aggregated virtual bus encoding may be stored in another storage, such as a register associated with an upstream port of the fabric switch. More specifically, this register may store the highest virtual bus encoding that was last sent upstream from the fabric switch. If it is determined at diamond 440 that the encodings differ, control passes to block 450 where the value stored in the storage for the upstream port may be updated to this selected value. Thereafter control passes to block 460 where the selected virtual bus encoding may be sent upstream via a control flit or other control message. Depending upon the location of this fabric switch in a hierarchy, the fabric switch may send this control upstream to, e.g., another fabric switch or a host processor or other upstream device.

Otherwise if it is determined at diamond 440 that the selected virtual bus encoding does not differ from the stored prior aggregated virtual bus encoding, control instead passes to block 470 where there is no control flit sent, since the maximum value of the virtual bus encodings has not changed. As a result, reduced link bandwidth is consumed. Understand while shown at this high level in the embodiment of FIG. 4, many variations and alternatives are possible.

Figure 5:
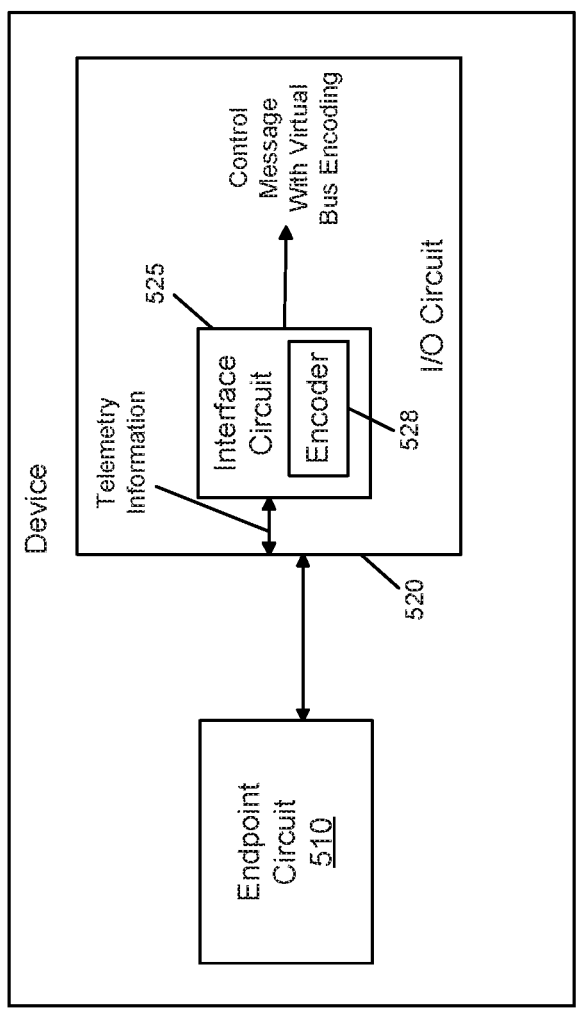
FIG. 5 is a block diagram of an endpoint device in accordance with an embodiment.

Referring now to FIG. 5, shown is a block diagram of an endpoint device in accordance with an embodiment. As shown in FIG. 5, endpoint device 500 may be any type of endpoint such as a computing engine, a memory device or so forth. In any event, device 500 includes an endpoint circuit 510 such as a given processing unit or memory media. In turn, endpoint circuit 510 couples to an input/output (I/O) circuit 520.

In embodiments herein, assume endpoint circuit 510 is a memory device such as a DRAM or non-volatile memory device. Further assume that this memory device includes control circuitry configured to monitor operation, activity levels and so forth, and provide telemetry information, e.g., in the form of bandwidth information, to I/O circuit 520.

In turn, this telemetry information is provided to an interface circuit 525 within I/O circuit 520. In embodiments herein, interface circuit 525 may encode the telemetry information into a given virtual bus encoding within an encoder 528. To this end, encoder 528 may include or be associated with a table of threshold values such that it may compare the incoming telemetry information to corresponding thresholds. Based upon which threshold the telemetry information crosses, encoder 528 may encode the telemetry information (e.g., bandwidth level) into a corresponding virtual bus encoding.

Interface circuit 525 may generate a control message such as a control flit including this virtual bus encoding, e.g., placed within a payload field of the control message. In embodiments herein, I/O circuit 520 may be configured to send such control messages upstream, e.g., either according to a predetermined schedule or upon a change to the telemetry information. Understand while shown at this high level in the embodiment of FIG. 5, many variations and alternatives are possible.

Figure 6:
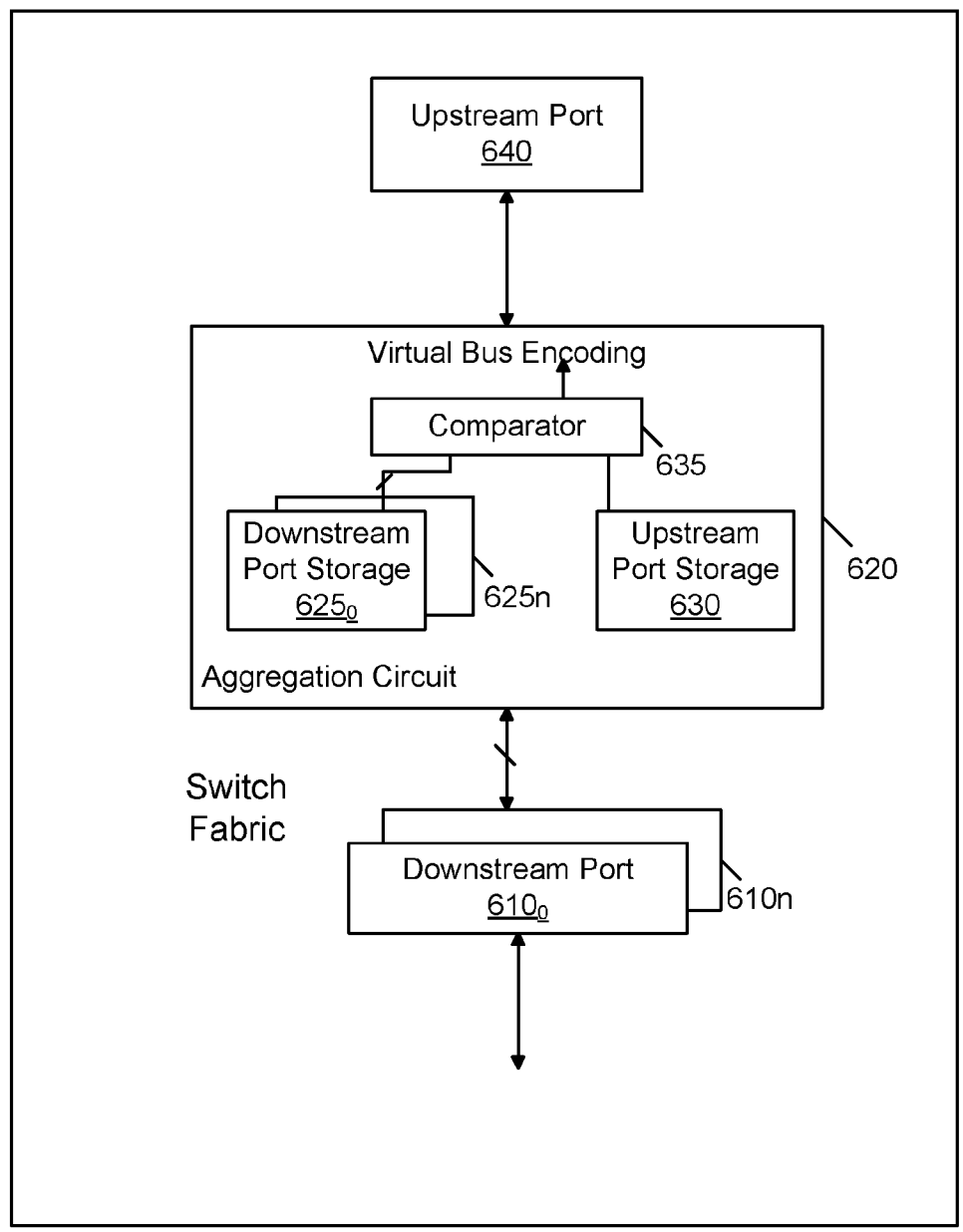
FIG. 6 is a block diagram of a fabric switch in accordance with an embodiment.

Referring now to FIG. 6, shown is a block diagram of a fabric switch in accordance with an embodiment. As shown in FIG. 6, fabric switch 600 is configured as a switch to couple between multiple downstream devices each connected coupled to a different downstream port $610_{0-n}$, and an upstream device such as another fabric switch, host processor or so forth, coupled to an upstream port 640.

As illustrated in the high level of FIG. 6, fabric switch 600 includes an aggregation circuit 620 that is configured to receive incoming control messages from downstream devices and aggregate information in the messages (such as virtual bus encodings as described herein) to send a single aggregated encoding upstream. In the embodiment of FIG. 6, aggregation circuit 620 includes multiple downstream port storages $625_{0-n}$. In an embodiment, each port storage 625 may be implemented as a register to store a current value of a virtual bus encoding received in a control message from an associated downstream device. In turn, upstream port storage 630 may be implemented as a register to store a current value of the maximum virtual bus encoding, namely the last encoding communicated upstream.

When a new virtual bus encoding value is received from a given downstream device, it is stored in an associated downstream port storage 625. As shown, aggregation circuit 620 further includes a comparator 635 that is configured to compare a virtual bus encoding value stored in upstream port storage 630 to the virtual bus encoding values stored in downstream port storages 625, to identify when a change occurs. When a change is identified such that a new highest value appears, this new highest virtual bus encoding value may be sent to the upstream device via upstream port 640 and also is stored in upstream port storage 630 as the current highest virtual bus encoding value. Understand while shown at this high level in the embodiment of FIG. 6, variations and alternatives are possible.

Referring now to Table 1, shown is a control message format in accordance with an embodiment of the present invention. Table 1 shows a control flit format for use according to a CXL-based communication protocol. In Table 1, the control flit is a link layer credit (LLCRD) control flit. This flit may be formed of a single slot, itself having 16 bytes. As shown, header information is present to indicate that the flit type is a credit control flit and further includes various fields to identify credit levels for different channels including a response channel, a request channel and a data channel. In addition by way of this control flit, various acknowledge information can be sent. Still further in accordance with an embodiment, two different virtual bus fields are provided, each of which may be four bits. As seen, both virtual bus fields may fit within an 8-bit payload portion of the control flit (namely payload bits [15:9]).

With this arrangement, two different types of endpoint devices each may be associated with one of the virtual bus fields, to enable virtual bus encoding of telemetry information for a given endpoint device type. For example, a first virtual bus field (Virtual Bus [0]) may be associated with a first type of memory device (e.g., DRAM) and a second virtual bus field (Virtual Bus [1]) may be associated with a second type of memory device (e.g., non-volatile memory). Thus with this arrangement, a single control flit may communicate virtual bus encoding for two different device types. Of course, additional virtual bus fields may be provided, each associated with a given device type.

Note that this control flit communication having virtual bus information may provide a fast efficient manner of communicating sideband information from endpoint devices upstream, without the need to explicitly signal sideband information via a link.

TABLE 1

| 7 | 6 | 5 | 4 | 3 | 2 | 1 | 0 | |
|---|---|---|---|---|---|---|---|---|
| RSVD | | | | | Ak | RSVD | Type | 0 |
| RSVD | | | | | | | | 1 |
| RspCrd | | | | | | RSVD | | 2 |
| DataCrd | | | | | | ReqCrd | | 3 |
| SubType | | | | | | LLCTRL | | 4 |
| 0x0 | | | | | | | | 5 |
| | | | | | | | | 6 |
| | | | | | | | | 7 |
| Ack[7:4] | | | | | Rsvd | | Ack[2:0] | 8 |
| VirtualBus[1][3:0] | | | | | | VirtualBus[0][3:0] | | 9 |
| Payload[23:16] | | | | | | | | 10 |
| Payload[31:24] | | | | | | | | 11 |
| Payload[39:32] | | | | | | | | 12 |
| Payload[47:40] | | | | | | | | 13 |
| Payload[55:48] | | | | | | | | 14 |
| Payload[63:56] | | | | | | | | 15 |

Referring now to Table 2, shown is an illustration of a chronological aggregation of virtual bus encodings. As illustrated, assume for devices are coupled to a switch fabric. Table 2 shows a plurality of time instants T0-T5. At each of these time instants, each device has a given local logical state corresponding to a given virtual bus encoding. In an embodiment, this local logical state may correspond to a given bandwidth level. With a 4-bit virtual bus encoding, up to 16 different bandwidth levels can be encoded.

In Table 2, note that each in each time instant, a single device's virtual bus encoding is highlighted, indicating a maximum encoding value of the different virtual bus encodings. In an embodiment, a switch fabric may include downstream port storages, e.g., registers to store these different values. In addition, the switch fabric may include an upstream port storage, e.g., another register to store a maximum one of these different encodings. And as described above, the switch fabric may be configured, upon a change to a maximum virtual bus encoding, to communicate such information upstream via a control flit as described herein. Thus in the embodiment of Table 2, the switch port may send control flit messages upstream at time instants T0, T1, T2, T4 and T5.

TABLE 2

| Time | Device 0 | Device 1 | Device 2 | Device 3 | Switch |
|---|---|---|---|---|---|
| T0 | 4'b0000 | 4'b0001 | 4'b0000 | 4'b0000 | 4'b0001 |
| T1 | 4'b0000 | 4'b0000 | 4'b0000 | 4'b0000 | 4'b0000 |
| T2 | 4'b0000 | 4'b0000 | 4'b1100 | 4'b0000 | 4'b1100 |
| T3 | 4'b1000 | 4'b0001 | 4'b1100 | 4'b0101 | 4'b1100 |
| T4 | 4'b1000 | 4'b0001 | 4'b0000 | 4'b0101 | 4'b1000 |
| T5 | 4'b1001 | 4'b1000 | 4'b1000 | 4'b1100 | 4'b1100 |

As described above, in certain use cases multiple devices attached behind a switch fabric may be provided for port expansion capabilities. In such arrangements, such as shown above in FIG. 3, a single aggregated global encoding may be communicated upstream to identify particular local logical state changes.

Figure 7:
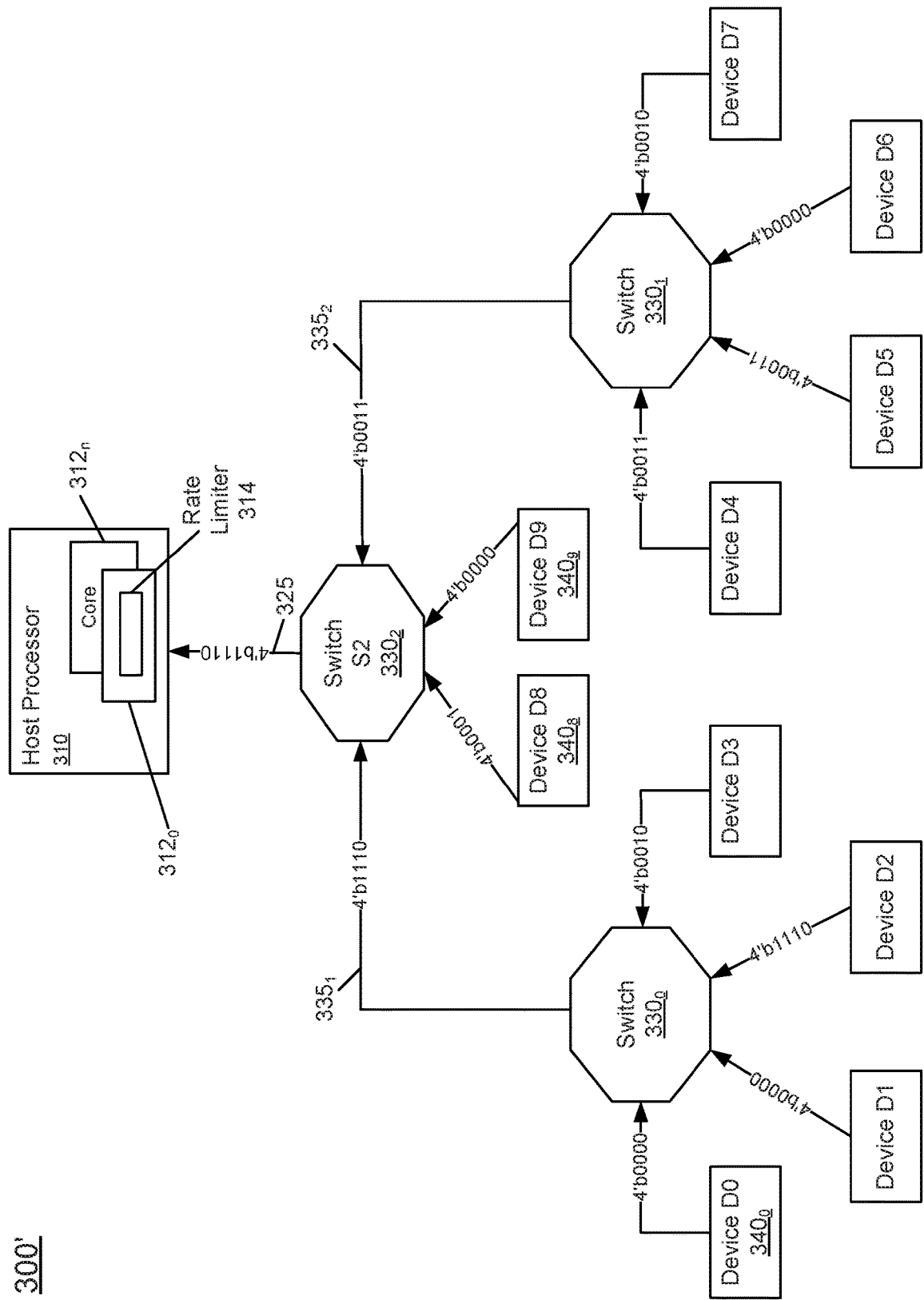
FIG. 7 is a block diagram of a system that illustrates virtual bus encoding aggregation in accordance with an embodiment.

Referring now to FIG. 7, shown is a block diagram of a system that illustrates virtual bus encoding aggregation in accordance with an embodiment. As shown in FIG. 7, system 300' may be the same as in FIG. 3. However, note that in this example, each endpoint device is communicating a virtual bus encoding upstream.

With embodiments that provide telemetry information in the form of bandwidth information upstream, a host processor or other upstream agent may perform rate metering. To this end, the host processor or other upstream agent may throttle one or more traffic sources to effectively manage platform quality of service.

With this arrangement, fabric switch 330 operates to aggregate virtual bus encodings from their downstream-attached endpoint devices 340. With the virtual bus encodings shown in FIG. 7, fabric switch $330_0$ may send a maximum one of the four received virtual bus encodings upstream to fabric switch $330_2$. In turn, fabric switch $330_1$ also may send a maximum one of the four received virtual bus encodings upstream to fabric switch $330_2$. At a next level of the hierarchical arrangement, fabric switch $330_2$ sends a single virtual bus encoding corresponding to the highest encoded value presented from various devices in the hierarchy upstream to host processor 310.

Note that with this arrangement, fabric switch $330_2$ sends a state change, referred to as a global logical state change, to host processor 310 if and only if there is a change in aggregated virtual bus encoding. When a change in one or more local logical states does not impact the maximum aggregated virtual bus encoding, there is no need to send another control message, as there is no new global state change to communicate.

As shown in FIG. 7, host processor 310 includes a plurality of cores 312. In embodiments herein at least one of these cores may include a rate limiter 314, which may be implemented as a hardware circuit. Rate limiter 314 may be configured to throttle one or more memory traffic sources when it is determined that a received virtual bus encoding for a given memory device type exceeds a limit threshold.

Figure 8:
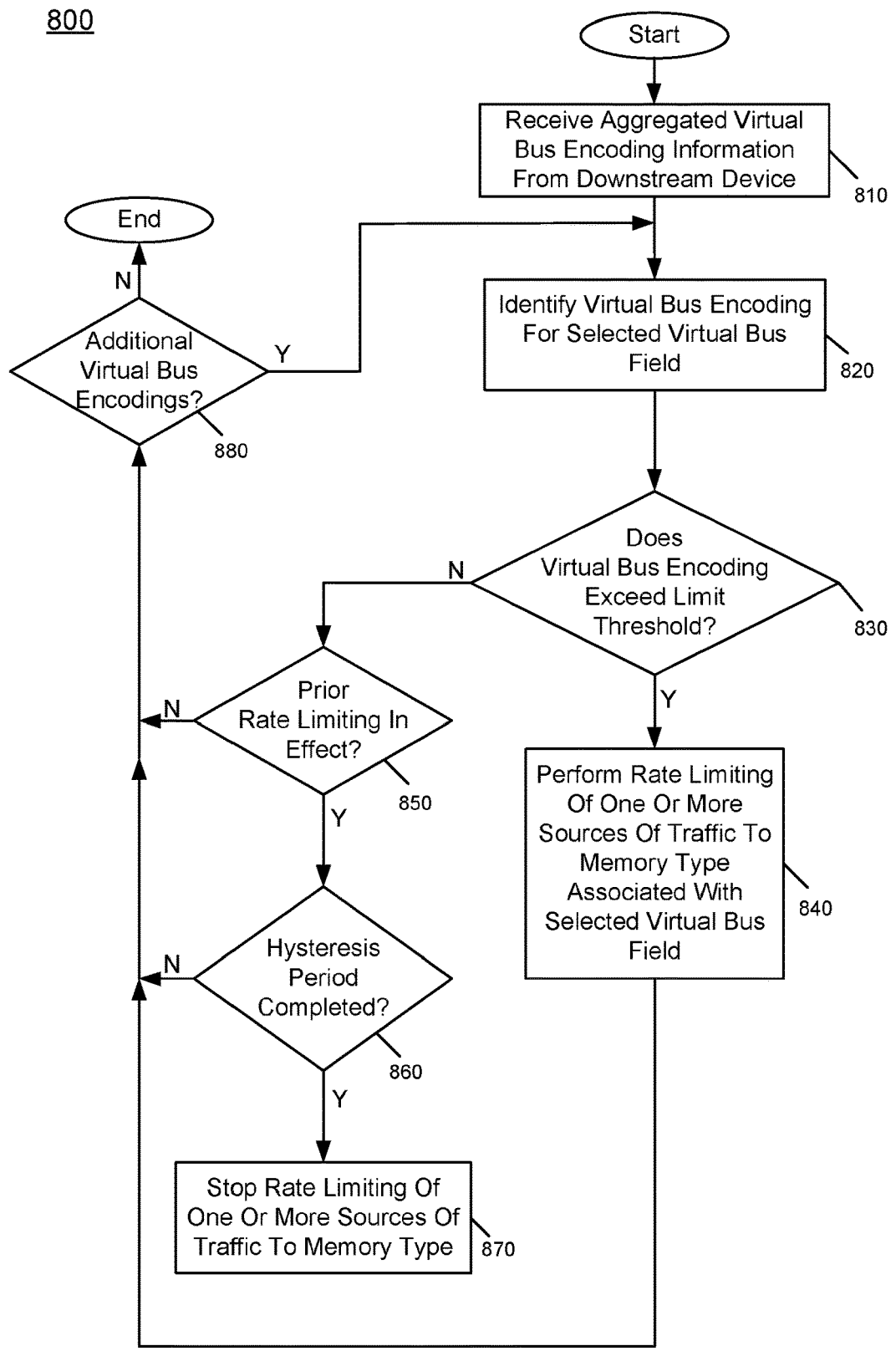
FIG. 8 is a flow diagram of a method in accordance with another embodiment of the present invention.

Referring now to FIG. 8, shown is a flow diagram of a method in accordance with another embodiment of the present invention. As shown in FIG. 8, method 800 is a method for performing rate limiting based at least in part on aggregated virtual bus encodings received from multiple endpoint devices. As such, method 800 may be performed by a rate limiter circuit, which in an embodiment may be implemented within a processor core. Accordingly, method 800 may be performed by hardware circuitry, firmware, software and/or combinations thereof.

As illustrated, method 800 begins by receiving aggregated virtual bus encoding information from a downstream device (block 810). For example, a host processor may receive an aggregated virtual bus encoding in one or more virtual bus fields of a control flit. Thus at block 820 the host processor (e.g., a given core of the processor) may identify a virtual bus encoding for a selected virtual bus field. Assume an implementation with two virtual bus fields, each associated with a given memory type. At block 820 a first virtual bus encoding is identified for a first virtual bus field. Next at block 830 it is determined whether this virtual bus encoding exceeds a limit threshold. If so, control passes to block 840 where the rate limiter may perform rate limiting of one or more sources of traffic to the memory type. For example, the rate limiter may cause the core to throttle a source of memory traffic e.g., by reducing a stream of memory requests or so forth.

Still with reference to FIG. 8, if it is determined instead that the virtual bus encoding does not exceed the limit threshold, control passes diamond 850 where it is determined whether a prior rate limit is in effect. If not, control passes to diamond 880 to determine whether there are additional virtual bus fields present in the received control flit. If so, control passes back to block 820 discussed above. Otherwise the method concludes.

Still with reference to FIG. 8 if it is determined at diamond 850 that there is a prior rate limiting in effect, control passes to diamond 860 to determine whether a hysteresis period has completed. This hysteresis period may be used to prevent frequent toggling between rate limiting and not limiting. If it is determined that a hysteresis period has completed, control passes to block 870 where the rate limiting may be terminated. Understand while shown at this high level in the embodiment of FIG. 8, many variations and alternatives are possible.

Figure 9:
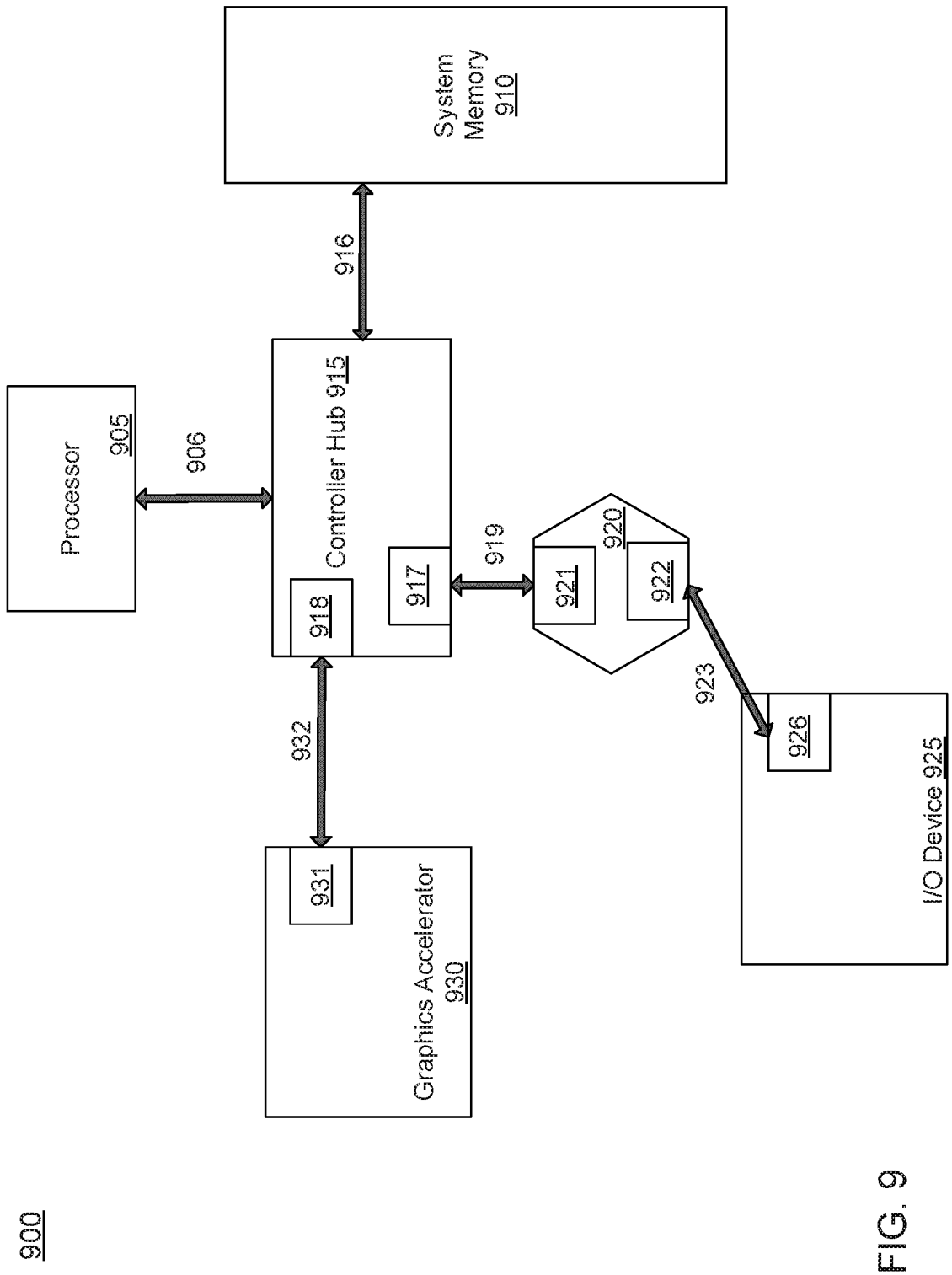
FIG. 9 is an embodiment of a fabric composed of point-to-point links that interconnect a set of components.

Embodiments may be implemented in a wide variety of interconnect structures. Referring to FIG. 9, an embodiment of a fabric composed of point-to-point links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect. In an embodiment, processor 905 (or other components of system 900) may be implemented with one or more integrated circuits that can communicate sideband information by way of virtual bus encodings, as described herein.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a PCIe interconnection hierarchy. Examples of controller hub 915 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e., up a hierarchy towards a root complex, to controller hub 915 and downstream, i.e., down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a memory expander, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C or CXL bus, as examples.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. A graphics controller or the graphics accelerator 930 itself may be integrated in processor 905.

Figure 10:
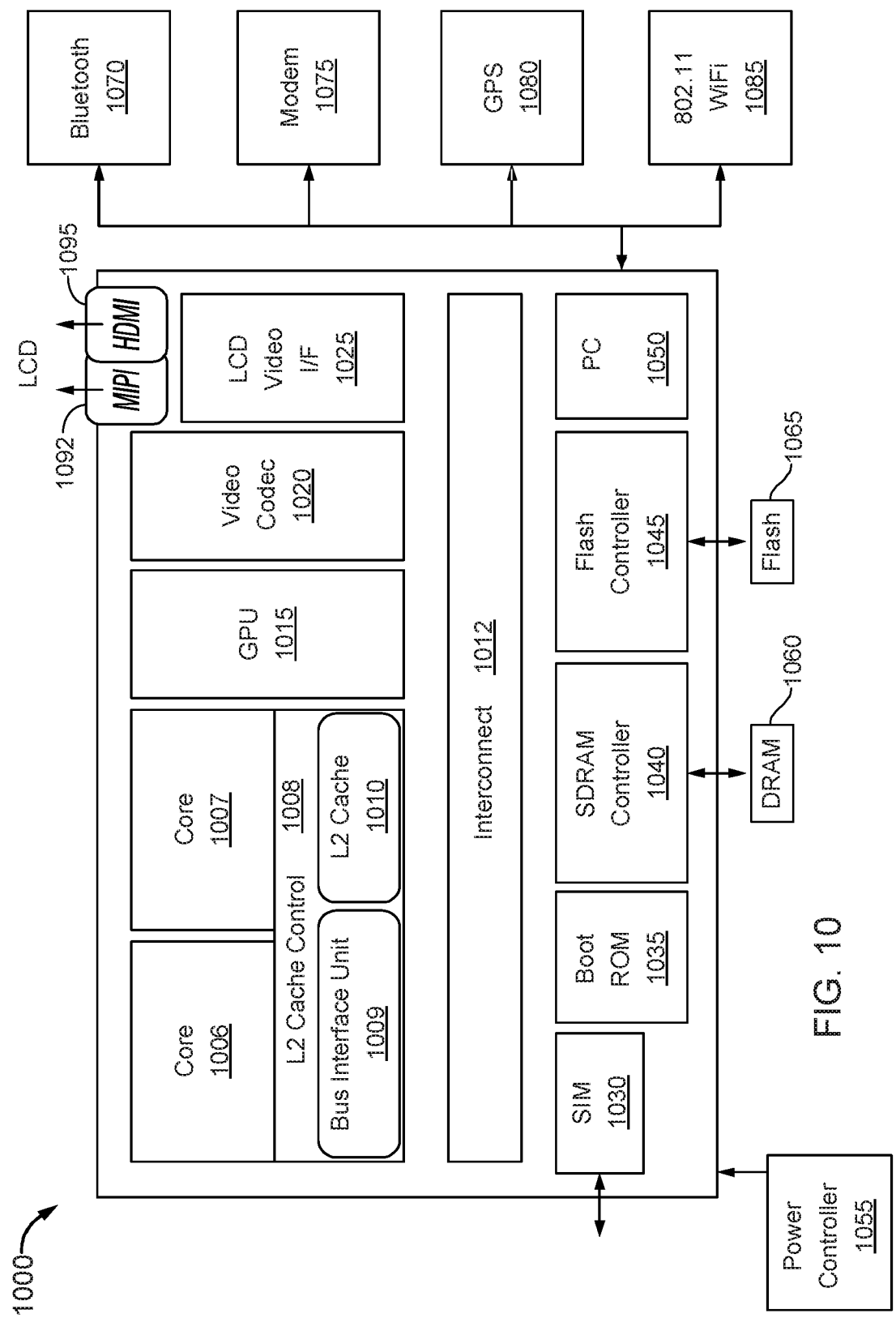
FIG. 10 is an embodiment of a system-on-chip design in accordance with an embodiment.

Turning next to FIG. 10, an embodiment of a SoC design in accordance with an embodiment is depicted. As a specific illustrative example, SoC 1000 may be configured for insertion in any type of computing device, ranging from portable device to server system. Here, SoC 1000 includes 2 cores 1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache controller 1008 that is associated with bus interface unit 1009 and L2 cache 1010 to communicate with other parts of system 1000 via an interconnect 1012.

Interconnect 1012 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g., DRAM 1060), a flash controller 1045 to interface with non-volatile memory (e.g., flash 1065), a peripheral controller 1050 (e.g., an eSPI interface) to interface with peripherals, video codec 1020 and video interface 1025 to display and receive input (e.g., touch enabled input), GPU 1015 to perform graphics related computations, etc. In an embodiment, interconnect 1012 may be configured to communicate packets that have virtual bus encodings, as described herein. In addition, the system illustrates peripherals for communication, such as a Bluetooth module 1070, 3G modem 1075, GPS 1080, and WiFi 1085. Also included in the system is a power controller 1055. Further illustrated in FIG. 10, system 1000 may additional include interfaces including a MIPI interface 1092, e.g., to a display and/or an HDMI interface 1095 also which may couple to the same or a different display.

Figure 11:
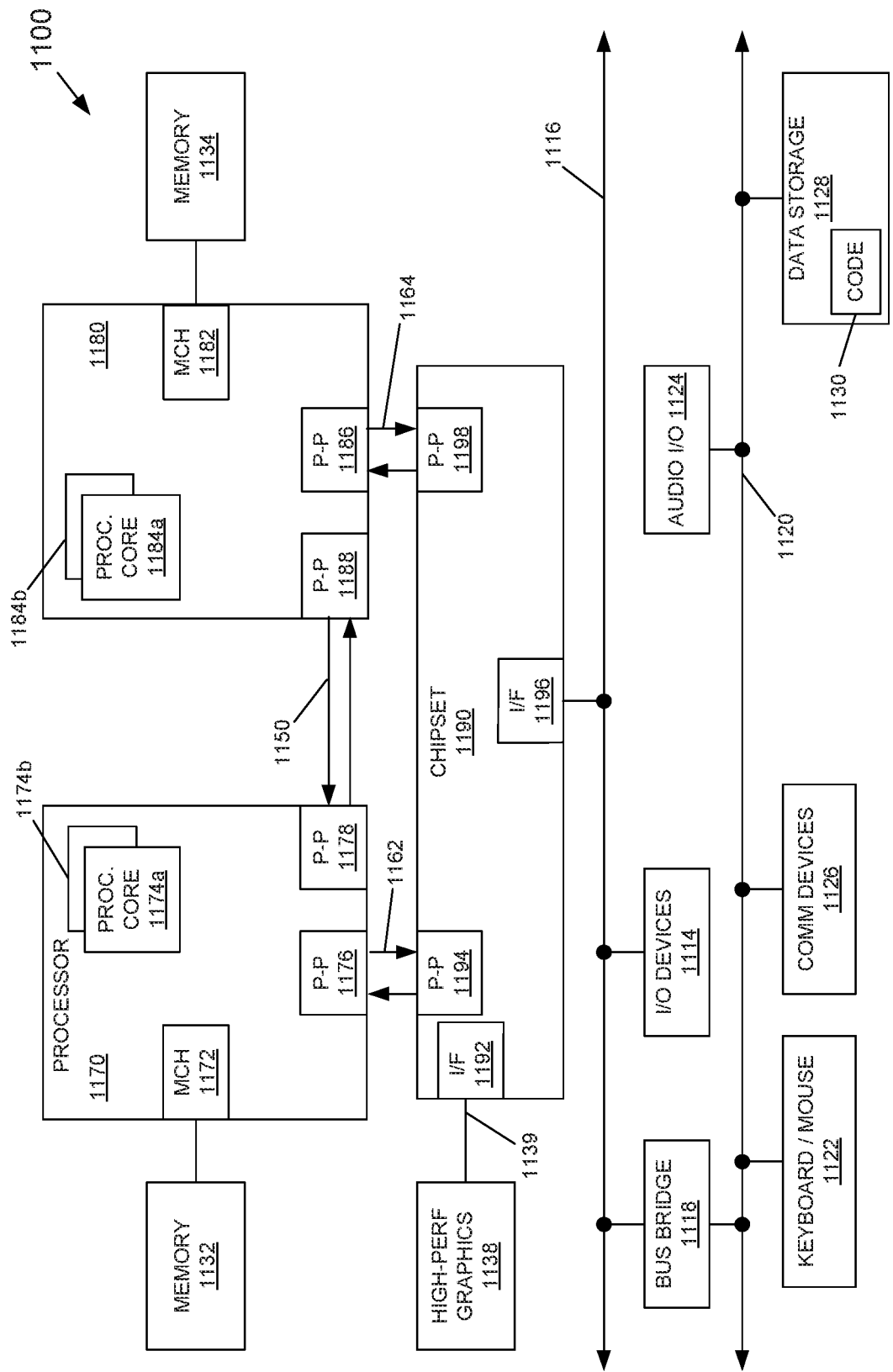
FIG. 11 is a block diagram of a system in accordance with an embodiment of the present invention.

Referring now to FIG. 11, shown is a block diagram of a system in accordance with an embodiment of the present invention. As shown in FIG. 11, multiprocessor system 1100 includes a first processor 1170 and a second processor 1180 coupled via a point-to-point interconnect 1150. As shown in FIG. 11, each of processors 1170 and 1180 may be many core processors including representative first and second processor cores (i.e., processor cores 1174a and 1174b and processor cores 1184a and 1184b). In an embodiment, processors 1170 and 1180 and other components may couple via interconnects that can realize reduced communication bandwidth by leveraging virtual bus encodings, as described herein.

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of system memory (e.g., DRAM) locally attached to the respective processors. First processor 1170 and second processor 1180 may be coupled to a chipset 1190 via P-P interconnects 1162 and 1164, respectively. As shown in FIG. 11, chipset 1190 includes P-P interfaces 1194 and 1198.

Furthermore, chipset 1190 includes an interface 1192 to couple chipset 1190 with a high performance graphics engine 1138, by a P-P interconnect 1139. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120.

The following examples pertain to further embodiments.

In one example, an apparatus includes: an endpoint circuit to perform an endpoint operation on behalf of a host processor; and an I/O circuit coupled to the endpoint circuit. The I/O circuit may include an interface circuit to receive telemetry information from the endpoint circuit, encode the telemetry information into a virtual bus encoding and place the virtual bus encoding into a payload field of a control message. The I/O circuit may also communicate the control message having the payload field including the virtual bus encoding to an upstream device.

In an example, the telemetry information comprises bandwidth information of the endpoint circuit, and the endpoint circuit comprises a memory device of a first media type, where the memory device is part of a memory expander.

In an example, the memory expander further comprises at least one other memory device of a second media type to encode second telemetry information into a second virtual bus encoding and place the second virtual bus encoding into a different portion of the payload field of the control message.

In an example, the interface circuit is to encode the telemetry information into the virtual bus encoding having a first value when the bandwidth information is less than a first threshold.

In an example, the interface circuit is to encode the telemetry information into the virtual bus encoding having a second value when the bandwidth information is greater than the first threshold.

In an example, the interface circuit comprises an encoder to encode the telemetry information into the virtual bus encoding.

In an example, the I/O circuit is to receive a second control message from the upstream device, the second control message having a second virtual bus encoding, and the interface circuit is to decode the second virtual bus encoding and provide a decoded control message to the endpoint circuit to cause the endpoint circuit to perform at least one operation.

In an example, the I/O circuit is to asynchronously communicate the control message in response to a logical state change of the endpoint circuit.

In an example, the control message comprises a control flit of a communication protocol.

In an example, the control flit comprises a link layer control flit.

In another example, a method comprises: receiving, in a fabric switch, a plurality of control messages, each of the plurality of control messages received from a downstream device coupled to the fabric switch; extracting an encoding from each of the plurality of control messages, the encoding associated with telemetry information of the corresponding downstream device; selecting the encoding having a highest value of the encoding; and in response to determining that the selected encoding is different than a prior encoding sent to an upstream device coupled to the fabric switch, sending the selected encoding to the upstream device.

In an example, the method further comprises preventing sending the selected encoding when the selected encoding is not different than a stored encoding stored in a storage of the fabric switch, the stored encoding comprising the prior encoding.

In an example, the method further comprises storing the selected encoding in the storage when the selected encoding is different than the stored encoding.

In an example, the method further comprises sending the selected encoding to the upstream device within a control message of a communication protocol.

In an example, the method further comprises sending a plurality of encodings to the upstream device within the control message, each of the plurality of encodings associated with a different type of downstream device.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises a host processor having a plurality of cores and a downstream port, at least one of the plurality of cores comprising a rate limiter to control a source of memory traffic based at least in part on a virtual bus encoding received in the downstream port. The system may further include a fabric switch coupled to the downstream port of the host processor via a first interconnect. The fabric switch includes an aggregation circuit to: receive a plurality of control messages from at least some of a plurality of endpoint devices coupled to the fabric switch; extract a virtual bus encoding from each of the plurality of control messages, the virtual bus encoding associated with telemetry information of the corresponding endpoint device; select the virtual bus encoding having a highest value; and send the virtual bus encoding having the highest value to the host processor. The system also may include the plurality of endpoint devices coupled to the fabric switch. At least some of the plurality of endpoint devices comprise an I/O circuit to receive telemetry information regarding the endpoint device, encode the telemetry information into the virtual bus encoding and send the control message including the virtual bus encoding to the fabric switch.

In an example, the telemetry information comprises bandwidth information of a memory device of a first media type, where the memory device is part of a memory expander.

In an example, the memory expander further comprises at least one other memory device of a second media type, the at least one other memory device of the second media type to encode second telemetry information into a second virtual bus encoding, and where the rate limiter is to not throttle a first source of memory traffic directed to the first media type and throttle a second source of memory traffic directed to the second media type based at least in part on the second virtual bus encoding.

In an example, the I/O circuit is to encode the telemetry information comprising bandwidth information into the virtual bus encoding having a first value when the bandwidth information is less than a first threshold and encode the telemetry information into the virtual bus encoding having a second value when the bandwidth information is greater than the first threshold.

In an example, the at least some of the plurality of endpoint devices are to send the plurality of control messages asynchronously and the aggregation circuit is to send the send the virtual bus encoding having the highest value to the host processor only when there is a change to the highest value.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an endpoint circuit to perform an endpoint operation on behalf of a host processor, the endpoint circuit comprising a memory device of a first media type, wherein the memory device is part of a memory expander; and
an input/output (I/O) circuit coupled to the endpoint circuit, the I/O circuit including an interface circuit to receive telemetry information comprising bandwidth information of the endpoint circuit, encode the telemetry information into a virtual bus encoding having a value based on the bandwidth information and place the virtual bus encoding into a payload field of a control message, wherein the I/O circuit is to communicate the control message having the payload field including the virtual bus encoding to an upstream device.

2. The apparatus of claim 1, wherein the memory expander further comprises at least one other memory device of a second media type, the at least one other memory device of the second media type to encode second telemetry information into a second virtual bus encoding and place the second virtual bus encoding into a different portion of the payload field of the control message.

3. The apparatus of claim 1, wherein the interface circuit is to encode the telemetry information into the virtual bus encoding having a first value when the bandwidth information is less than a first threshold.

4. The apparatus of claim 3, wherein the interface circuit is to encode the telemetry information into the virtual bus encoding having a second value when the bandwidth information is greater than the first threshold.

5. The apparatus of claim 1, wherein the interface circuit comprises an encoder to encode the telemetry information into the virtual bus encoding.

6. The apparatus of claim 1, wherein the I/O circuit is to receive a second control message from the upstream device, the second control message having a second virtual bus encoding, and wherein the interface circuit is to decode the second virtual bus encoding and provide a decoded control message to the endpoint circuit to cause the endpoint circuit to perform at least one operation.

7. The apparatus of claim 1, wherein the I/O circuit is to asynchronously communicate the control message in response to a logical state change of the endpoint circuit.

8. The apparatus of claim 1, wherein the control message comprises a control flit of a communication protocol.

9. The apparatus of claim 8, wherein the control flit comprises a link layer control flit.

10. At least one non-transitory computer readable storage medium having stored thereon instructions, which if performed by a machine cause the machine to perform a method comprising:
receiving, in a fabric switch, a plurality of control messages, each of the plurality of control messages received from a downstream device coupled to the fabric switch;

extracting an encoding from each of the plurality of control messages, the encoding associated with telemetry information of the corresponding downstream device;

selecting the encoding having a highest value of the encoding; and in response to determining that the selected encoding is different than a prior encoding sent to an upstream device coupled to the fabric switch, sending the selected encoding to the upstream device.

11. The at least one non-transitory computer readable storage medium of claim 10, wherein the method further comprises preventing sending the selected encoding when the selected encoding is not different than a stored encoding stored in a storage of the fabric switch, the stored encoding comprising the prior encoding.

12. The at least one non-transitory computer readable storage medium of claim 11, wherein the method further comprises storing the selected encoding in the storage when the selected encoding is different than the stored encoding.

13. The at least one non-transitory computer readable storage medium of claim 10, wherein the method further comprises sending the selected encoding to the upstream device within a control message of a communication protocol.

14. The at least one non-transitory computer readable storage medium of claim 10, wherein the method further comprises sending a plurality of encodings to the upstream device within the control message, each of the plurality of encodings associated with a different type of downstream device.

15. A system comprising:
a host processor having a plurality of cores and a downstream port, at least one of the plurality of cores comprising a rate limiter to control a source of memory traffic based at least in part on a virtual bus encoding received in the downstream port;
a fabric switch coupled to the downstream port of the host processor via a first interconnect, the fabric switch including an aggregation circuit, wherein the aggregation circuit is to:
receive a plurality of control messages from at least some of a plurality of endpoint devices coupled to the fabric switch;
extract a virtual bus encoding from each of the plurality of control messages, the virtual bus encoding associated with telemetry information of the corresponding endpoint device;
select the virtual bus encoding having a highest value; and
send the virtual bus encoding having the highest value to the host processor; and
the plurality of endpoint devices coupled to the fabric switch, wherein the at least some of the plurality of endpoint devices comprise:
an input/output (I/O) circuit to receive telemetry information regarding the endpoint device, encode the telemetry information into the virtual bus encoding and send the control message including the virtual bus encoding to the fabric switch.

16. The system of claim 15, wherein the telemetry information comprises bandwidth information of a memory device of a first media type, wherein the memory device is part of a memory expander.

17. The system of claim 16, wherein the memory expander further comprises at least one other memory device of a second media type, the at least one other memory device of the second media type to encode second telemetry information into a second virtual bus encoding, and wherein the rate limiter is to not throttle a first source of memory traffic directed to the first media type and throttle a second source of memory traffic directed to the second media type based at least in part on the second virtual bus encoding.

18. The system of claim 16, wherein the I/O circuit is to encode the telemetry information comprising bandwidth information into the virtual bus encoding having a first value when the bandwidth information is less than a first threshold and encode the telemetry information into the virtual bus encoding having a second value when the bandwidth information is greater than the first threshold.

19. The system of claim 16, wherein the at least some of the plurality of endpoint devices are to send the plurality of control messages asynchronously and the aggregation circuit is to send the virtual bus encoding having the highest value to the host processor only when there is a change to the highest value.

* * * * *